Figures 1, 2:
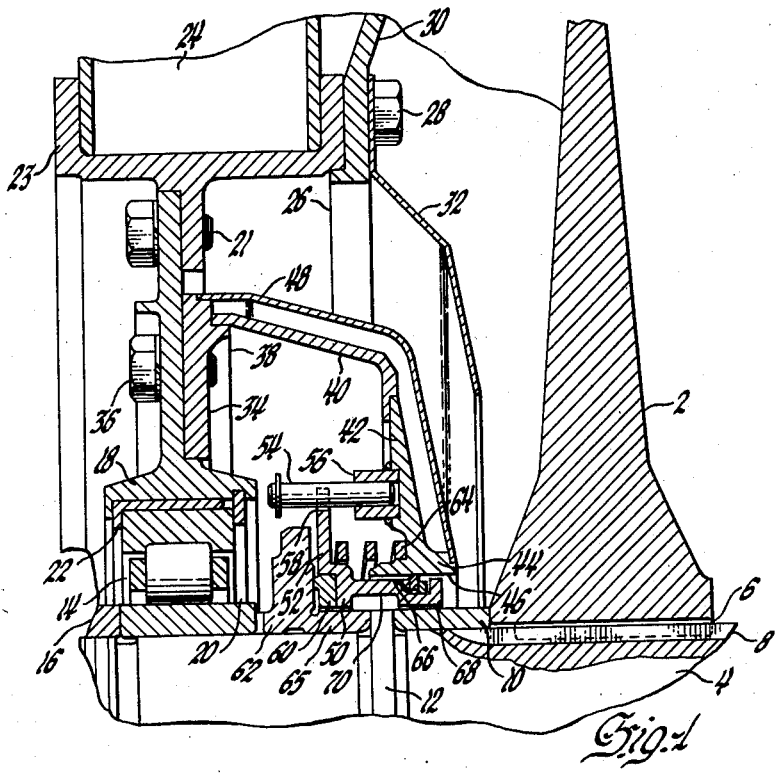

Nov. 26, 1957     R. A. TRUAX     2,814,511

SEAL

Filed April 18, 1955

INVENTOR
Ross O. Truax
BY Paul Fitzpatrick
ATTORNEY

United States Patent Office 2,814,511
Patented Nov. 26, 1957

2,814,511
SEAL

Ross A. Truax, Mooresville, Ind., assignor to General Motors Corporation, Detroit, Mich., a corporation of Delaware Application April 18, 1955, Serial No. 501,895

3 Claims. (Cl. 286—1)

This invention relates to a seal and more particularly to a fluid pressure seal for use in high pressure installations.

The seal of this invention is intended primarily for use in gas turbine engines. In such engines, the stator and the rotor expand and contract differentially as the engine is started and stopped because of the great temperature change. The operating fluid entering the turbine is under high pressure, and this fluid must be contained for efficient operation of the engine. Seals are provided between the stator frame and the rotor to prevent the escape of the operating fluid and also to allow for the relative axial movement between these members caused by thermal expansion and contraction. Such seals ordinarily comprise a first rotating contact seal between the rotor and the stator, including a non-rotating part which is movable axially of the stator with the shaft, and a second sliding seal between this axially movable non-rotating part and the body of the stator. The present invention relates to the second or axially sliding seal.

The primary object of this invention is to provide an improved fluid pressure seal between relatively movable or reciprocable members in fluid pressure installations.

This and other objects of this invention will be readily apparent from the following specification and drawings, in which:

Figure 1 is an axial sectional view of a portion of a turbine with a seal according to this invention installed therein; and Figure 2 is an enlarged view of a portion of Figure 1.

Referring now to Figure 1 of the drawings, a turbine wheel 2 is mounted on the turbine shaft 4 by a splined bore 6 of the wheel cooperating with a splined portion 8 of the shaft. The turbine wheel is located by a spacer 10 fixed on the shaft and bearing against a flange 12 of the shaft. The forward portion of the shaft is mounted within a roller bearing 14 supported by the turbine stator frame, and the rear portion of the shaft is mounted within a similar bearing (not shown) also supported by the stator frame. The inner race of bearing 14 is located by a retainer 16 fixed on the shaft, and the outer race of the bearing is secured within the hub of an annular plate 18 by a split retaining ring 20, a spacer 22 being provided between the outer race and the hub.

The plate 18 forms part of the stator frame and is fixed by bolts 21 to an annular channel 23 which is connected to the outer casing of the engine by a number of struts 24. Additional support for plate 18 is provided by an annular member 26 fixed to channel 23 by bolts 28 and having spoke-like portions 30 secured to the outer casing of the engine. A heat shield 32 is bolted to member 26. A ring 34 fixed by bolts 36 to plate 18 has a shoulder 38, and an annular housing 40 is brazed or welded to this shoulder to mount the housing on the stator frame. A mounting plate 42 brazed or welded to housing 40 has a hub portion 44 provided with a smooth bore 46. A heat shield 48 which covers the housing and mounting plate is brazed or welded to ring 34 and the hub portion 44 of the mounting plate.

A cage 50 having a flange 52 fits within hub portion 44 of mounting plate 42 and is guided by a number of pins 54 fixed within circumferentially spaced bosses 56 on the mounting plate and extending through slots 58 in flange 52. A sealing ring 60 of carbon or other suitable material mounted in a recess in the forward face of the cage is held in sealing engagement with a follower 62 on the turbine shaft by a coil spring 64 extending between the mounting plate 42 and the flange 52 of cage 50. The follower 62 is fixed on the shaft and has a flange portion 65 bearing against the flange 12 of the turbine shaft. The outer annular surface 66 of cage 50 is spaced from the surface of bore 46, and the inner annular surface 68 of the cage is provided with an annular groove 70 and is spaced from the outer surface of spacer 10 and flange portion 65 of follower 62. Thus, as the turbine shaft rotates, the cage is prevented from rotating with follower 62 by the pins 54, but is allowed to shift axially of the stator with the shaft.

The forward face of the turbine wheel is bathed with compressor discharge air to cool the turbine wheel and to prevent combustion products entering the turbine from coming into contact with the seal. The compressor discharge air is at a slightly higher pressure than the combustion products and is released adjacent the hub of the turbine wheel, by means not shown. The compressor discharge air enters the space between the follower 62 and sealing ring 60 by passing between the inner surface 68 of cage 50 and the outer surfaces of retainer 10 and flange portion 52. Since the face area of sealing ring 60 is substantially equal to the area of the rear face of cage 50, cage 50 acts as a counterbalanced piston and there is no undue wear of sealing ring 60 by the pressure exerted against the rear face of cage 50 by the compressor discharge air. The roller bearing 14 is continually lubricated while the engine is running and the space to the rear of the bearing defined by housing 40 and plate 42 is maintained at atmospheric pressure. In order to prevent the compressor discharge air from entering into this space by passing between hub portion 44 of the mounting plate 42 and the outer surface 66 of cage 50, a seal is provided.

Referring now to Figure 2 of the drawings, an annular groove 72 is cut within surface 66 of cage 50. An expanding sealing ring 74 mounted within the groove seals against the surface of bore 46. The forward face of the ring bears against the forward wall of the groove and the inner periphery of the ring is spaced from the inner wall of the groove to provide a chamber 75. If this chamber were subject to compressor discharge air, the sealing pressure exerted by the expanding ring against the surface of bore 46 would be greatly increased by the pressure of the compressor discharge air so that any relative movement between the ring and the surface would cause undue wear and fretting or pitting of the surface.

In order to close this chamber from the compressor discharge air and maintain the sealing pressure of the expanding ring substantially constant at all times, a contracting ring 76 is also mounted within groove 72, with the inner periphery of the ring bearing against the inner wall of the groove and the forward face of the ring bearing against the rear face of the expanding ring 74. A number of vents 78 are provided from the chamber 75 to the forward side of the expanding ring to maintain atmospheric pressure in the chamber despite any leakage of compressor discharge air past the contracting ring. The expanding ring 74 is kept in sealing engagement with the forward wall of groove 72 by the air pressure on the rear faces of the two rings.

As the engine is started or stopped the stator frame and the turbine shaft expand and contract at different rates. Thus, the mounting plate 42 is shifted relative to the cage 50. By maintaining the sealing pressure of the expanding ring against the surface of bore 46 substantially constant and free of compressor discharge air pressure there is no wear or pitting of the surface caused by movement and undue sealing pressure. This seal prevents the compressor discharge air from escaping into the area of atmospheric pressure and it also prevents the lubricant which is supplied to the roller bearing from leaking into the turbine where it would be carbonized or would collect dust, both of which would interfere with turbine operation.

Although the seal of this invention has been shown and described in conjunction with the forward turbine bearing of a gas turbine engine, the seal can be used with success in other installations where high fluid pressure exists and it is desired to contain this pressure. By this novel arrangement of an expanding ring and a contracting ring together with vents from the chamber formed by the rings, there is provided a new and improved seal for high fluid pressure installations.

Although a specific embodiment of this invention has been shown and described, various changes and modifications may be made within the scope and spirit of the invention.

I claim:

1. A seal comprising, in combination, two relatively shiftable spaced annular members, one of said members being provided with at least one annular groove, a first ring fitting within said groove and having its outer periphery bearing against the other of said members to divide the space between said members into a relatively high fluid pressure area and a relatively low fluid pressure area, said ring being spaced from the lower wall of said groove and having a lateral face in sealing engagement with a lateral wall of said groove to form an open chamber between said ring and said grooved member, a second ring fitting within said groove and bearing against the other lateral face of said first ring and the lower wall of said grove to close said chamber, and means for venting said chamber to said low pressure area.

2. A seal comprising in combination, two relatively shiftable spaced annular members, one of said members being provided with at least one annular grove, an expanding ring fitting within said groove and having its outer periphery bearing against the other of said members to divide the space between said members into a relatively high fluid pressure area and a relatively low fluid pressure area, said ring being spaced from the lower wall of said groove and having a lateral face held in sealing engagement with a lateral wall of said groove by the fluid pressure difference between said areas to form an open chamber between said ring and said grooved member, a contracting ring fitting within said groove and bearing against the other lateral face of said expanding ring and the lower wall of said groove to close said chamber from said high pressure area, and means for venting said chamber to said low pressure area.

3. A seal comprising, in combination, a fixed annular member, a shiftable annular member in spaced telescopic relationship with said fixed annular member and provided with at least one annular groove, an expanding ring fitting within said groove and having its outer periphery bearing against said fixed annular member to divide the space between said members into a relatively high fluid pressure area and a relatively low fluid pressure lubricant receiving area, said ring being spaced from the lower wall of said groove and having a lateral face held in sealing engagement with a lateral wall of said groove by the fluid pressure difference between said areas to form an open chamber between said ring and said grooved member, a contracting ring fitting within said groove having a lateral face bearing against the other lateral face of said expanding ring and having its inner periphery bearing against the lower wall of said groove to close said chamber from said high pressure area, and means for venting said chamber to said low pressure area to maintain the sealing pressure of said expansible ring against the other of said members substantially constant under all operating conditions.

References Cited in the file of this patent
UNITED STATES PATENTS

| | | |
|---|---|---|
| 2,130,075 | Dennison | Sept. 13, 1938 |
| 2,267,262 | Bast | Dec. 23, 1941 |

FOREIGN PATENTS

| | | |
|---|---|---|
| 328,120 | Germany | Oct. 23, 1920 |